(12) United States Patent
Osaki et al.

(10) Patent No.: US 6,485,021 B1
(45) Date of Patent: Nov. 26, 2002

(54) MECHANICAL SEAL UNIT WITH TEMPORARILY CONNECTING INLET AND OUTLET GROOVES

(76) Inventors: Soichiro Osaki, 2-7-52, Hisamoto, Takatsu-ku, Kawasaki-shi Kanagawa-ken (JP); Rokuheiji Satoh, 4-5-13, Yokodai, Sagamihara-shi, Kanagawa-ken (JP)

(*) Notice: Subject to any disclaimer, the term of this patent is extended or adjusted under 35 U.S.C. 154(b) by 0 days.

(21) Appl. No.: 08/825,998

(22) Filed: Apr. 4, 1997

(51) Int. Cl.[7] ................................................. F16J 15/32
(52) U.S. Cl. ........................................................ 277/96.1
(58) Field of Search ............................ 277/29, 74, 96.1

(56) References Cited

U.S. PATENT DOCUMENTS

| 3,957,276 A | | 5/1976 | Wiese | |
|---|---|---|---|---|
| 4,523,764 A | * | 6/1985 | Albers et al. | 277/96.1 |
| 5,133,562 A | * | 7/1992 | Lipschitz | 277/96.1 |
| 5,180,173 A | * | 1/1993 | Kimura et al. | 277/96.1 |

FOREIGN PATENT DOCUMENTS

| DE | 574210 | | 4/1933 | |
|---|---|---|---|---|
| FR | 1238826 | | 7/1959 | |
| JP | 231269 | * | 12/1988 | 277/96.1 |
| SU | 1645689 | * | 4/1991 | 277/96.1 |
| SU | 1753133 | * | 8/1992 | 227/96.1 |

* cited by examiner

*Primary Examiner*—Scott Cummings

(57) ABSTRACT

According to the present invention, the mechanical seal unit for pumps including a fixed seal ring facing a lower pressure space and a rotatable seal ring facing a higher pressure space, comprises: at least one outlet groove disposed on a slidable seal face of the fixed seal ring and open exclusively to the lower pressure space; and at least one inlet groove disposed on a slidable seal face of the rotatable seal ring and open exclusively to the higher pressure space such that the inlet groove and the outlet groove partially meet to communicate with each other to form a fluid release passage at a certain point of rotation of the rotatable ring relative to the fixed ring. Otherwise the outlet and inlet grooves may be disposed on the rotatable ring and the fixed ring, respectively, to obtain the same effect.

4 Claims, 2 Drawing Sheets fixed sealing contact face A~A rotation sealing contact face B~B

MECHANICAL SEAL UNIT WITH TEMPORARILY CONNECTING INLET AND OUTLET GROOVES

BACKGROUND OF THE INVENTION

1. Field of the Invention

The present invention relates to a mechanical seal unit for pumps. More specifically, the present invention relates to a mechanical seal unit which can be suitably used for a pump which is strictly required to prevent inclusion of abrasion particles or dust into a fluid moving through the pump, such particles being inevitably produced from abrasion of sealing contact faces as they rotate slidably in a relatively opposite direction in a fluid tight condition.

The present invention further relates to a mechanical seal unit which otherwise may easily cause high friction heat, an abrasive mark and burn-in.

2. Description of the Related Art

A conventional mechanical seal for pumps may often cause pollution of liquids which are pumped through from abrasion particles or dust from wear of two sealing surfaces contacting slidably and sealably with each other. However, some types of pumps, for instance, those for extraordinary purified liquid pure water or extra-pure water for manufacturing and cleaning semi-conductors and LCDs must be strictly controlled to be free from inclusion of wear dust.

Biotechnology, medical laboratories and food-processing also require the same strict control of the liquid quality to be pumped. However, a suitable mechanical seal unit has not been proposed to solve this drawback.

For gas tight sealing, there is one known mechanical seal unit which is provided with a gas passage groove disposed on one of the two slidable seal faces for releasing wear particles out of the pump. This prior mechanical seal unit has a drawback in that the gas leaks through the passage groove which is communicative with the exterior or an atmosphere of a relatively low pressure even when the pump operation is stopped.

SUMMARY OF THE INVENTION

It is therefore an object of the present invention to provide mechanical seal unit which is constructed such that it enables an effective discharging of abrasion particles which are inevitably produced from the seal faces as they slidably move or rotate on each other.

The invented mechanical seal unit for pumps includes a fixed seal ring and a rotatable seal ring each providing a seal contact face such that the two seal faces slidably engage with each other in a fluid tight fashion. One of the fixed seal ring and the rotatable seal ring has on the contact face at least one inlet groove open exclusively to a higher pressure space, while the other of said two seal rings has on the contact seal face at least one outlet groove open exclusively to a lower pressure space or the exterior of the pump. The inlet groove and the outlet groove partially communicate with each other and jointly form an fluid passage only temporarily during relatively opposite rotation of the two contact faces.

In preferred embodiment of the present invention, the inlet groove may be disposed on the rotatable seal ring and said outlet groove may be disposed on the fixed seal ring, and said inlet and outlet groove have the same configuration.

For the configuration, the inlet groove may have a linear shape. Alternatively, the inlet groove may have a U-shape or V-shape.

BRIEF DESCRIPTION OF THE DRAWINGS

The above and other objects, and advantageous features of the present invention will be apparent from the following detailed description of the preferred embodiments when read with reference to the accompany drawings.

DESCRIPTION OF THE PREFERRED EMBODIMENT

Figure 1:
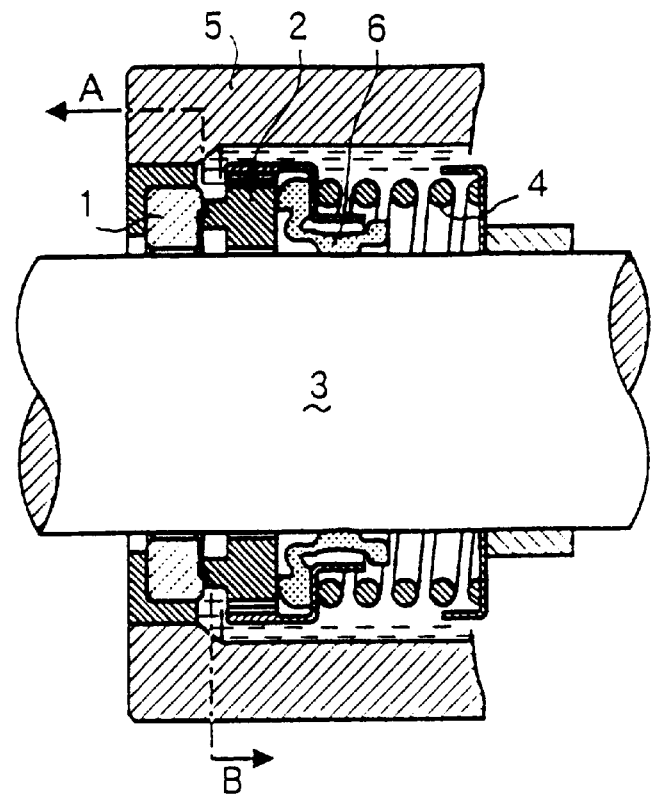
FIG. 1 is a partial cross-sectional view of a pump to which a preferred embodiment of the present invention is applied.

A first embodiment of the invention will now be explained hereinbelow with reference to FIGS. 1–3(A). FIG. 1 shows a partial cross-sectional view of a pump to which a preferred embodiment of the present invention is applied. A shaft 3 is rotatably supported by a supportive seal ring (not shown) and bears a screw unit thereon to rotate integrally with the same.

A fixed seal ring 1 is received in a casing 5 of the pump and engages slidably movable with a rotation seal ring 2 fixed coaxially on the shaft 3.

The rotation seal ring 2 is provided circumferentially with a bellow 6. The rotation seal ring 2 and shaft 3 cooperatively define a space with the atmosphere or a relatively lower pressure between them. The rotation seal ring 2 and the casing 5 cooperatively define a space with a high pressure in the drawing, in which a high pressure fluid 10 moves. A compression spring 4 is disposed coaxially along the shaft 3 to urge the rotation seal ring 2 toward the fixed seal ring 1 to contact with the latter for liquid tight engagement.

The sliding contact faces of the seal unit can be made of various materials, selective of or a combination of, such as carbon steel, ceramic, cemented carbide or other alloys, which is determined based on factors of what the pump will be used for and properties of the fluid for which the pump will be used.

Figure 2:
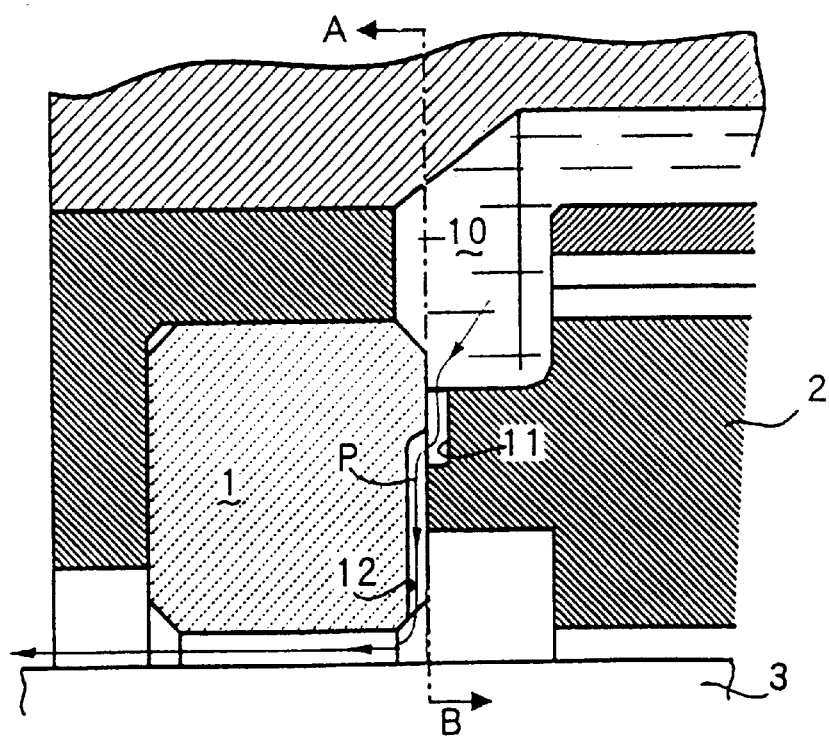
FIG. 2 is an enlarged cross-sectional view of the mechanical seal of FIG. 1 provided with a fluid passage communicating a high pressure environment and a lower pressure environment.
Figure 3A:
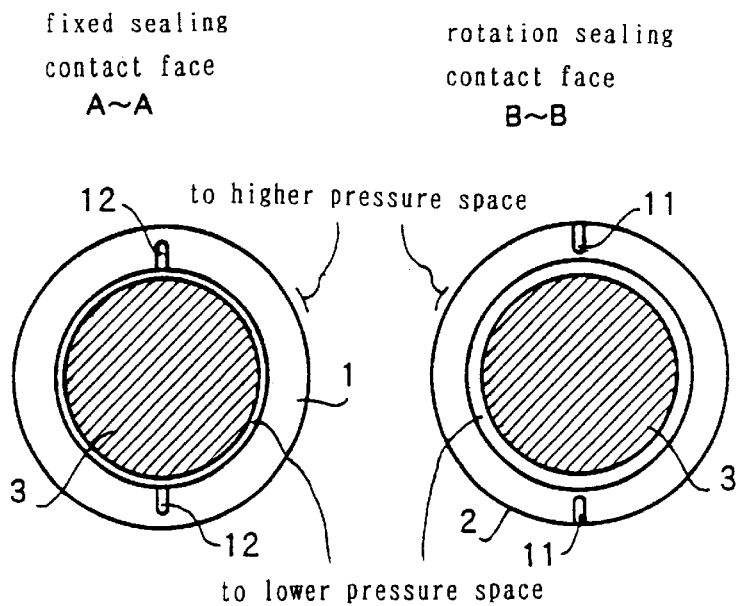
FIG. 3(A) is a pair of cross-sectional explanatory views seen in directions A and B in FIG. 2, showing a mechanical seal unit according to a first embodiment of the present invention and a relationship between the pair of sliding seal faces.

In FIG. 2, there is shown a fluid release passage formed in the mechanical seal unit communicating between a higher pressure space or chamber and a lower pressure space or the exterior atmosphere. This is a first embodiment of the present invention and important parts thereof are also shown in FIG. 3(A). In this mechanical seal unit, each of the seal faces of the fixed seal ring 1 and the rotation seal ring 2 includes a pair of grooves disposed thereon. As best shown in FIG. 3(A), the fixed seal ring 1 has a pair of grooves 12, 12 each having an outer closed end and an inner open end communicating with an inner peripheral portion open to the lower pressure space. In contrast, the rotation seal ring 2 has a pair of grooves 11, 11 each having an inner closed end and an outer open end communicating with an outer peripheral portion open to the high pressure space. As shown in FIG.

2, the corresponding grooves 11, 12 meet each other at a certain point of rotation of the rotation seal ring 2, when both the closed ends face against each other. At this moment, there is established a fluid release passage which temporarily allows a portion of the fluid to move from the high pressure space 10, through the groove 11 of the rotation seal ring 2 and the groove 12 of the fixed seal ring 1, to the lower pressure space.

Figure 3B:
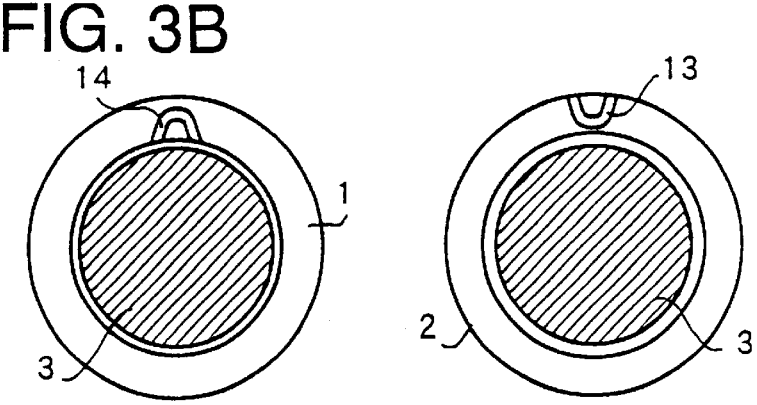
FIG. 3(B) is similar to FIG. 3(A) and shows a mechanical seal unit according to a second embodiment of the present invention.
Figure 3C:
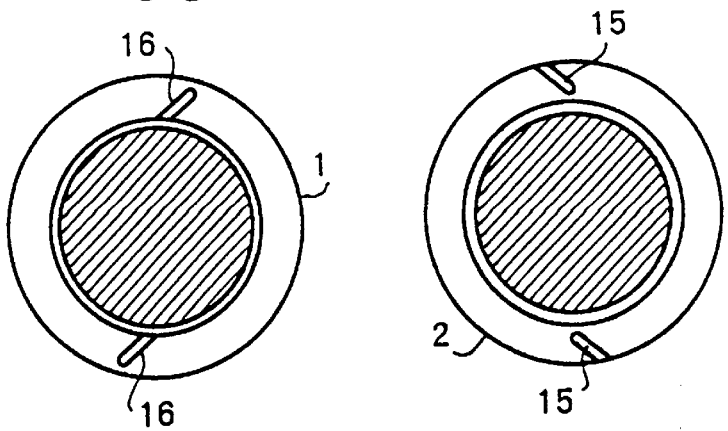
FIG. 3(C) is similar to FIG. 3(A) and shows a mechanical seal unit according to a third embodiment of the present invention.

FIG. 3(B) shows a second embodiment of the present invention, in which the fixed seal ring 1 has a pair of V-shaped grooves 14 formed on the slidable sealing face and having both ends communicating with the inner peripheral portion while the rotation seal ring 2 has a pair of V-shaped grooves 13 formed on the slidable sealing face and having both ends communicating with the outer peripheral portion. The corresponding grooves 13, 14 meet each other at their bent bottom portions in a similar manner to the first embodiment explained with reference to FIG. 2. As a result, there is established a fluid release passage which temporarily allows a portion of the fluid to move from the high pressure space 10 to the lower pressure space via the grooves 13 of the rotation seal ring 2 and the grooves 14 of the fixed seal ring 1.

According to a third embodiment of the present invention, the fixed seal ring 1 has a pair of linear grooves 16, 16 disposed on the slidable seal face such that they are located slightly oblique to each other with respect to the axis while the rotation seal ring 2 has a pair of linear grooves 15, 15 disposed on the slidable seal face such that they are also located slightly oblique to each other with respect to the axis and open to the outer peripheral portion, i.e. the higher pressure space. The grooves 16 of the fixed seal ring 1 have an outer closed end and an inner open end communicating with the inner peripheral portion (open to the lower pressure space). In contrast, the grooves 15 of the rotation seal ring 2 have an inner closed end and an outer open end communicating with an outer peripheral portion (open to the high pressure space).

The corresponding grooves 15, 16 meet each other, in a similar manner as the above described two embodiments, at a certain point of rotation when a fluid passage is temporarily established a fluid release passage which allows a portion of the fluid to move from the high pressure space 10 to the lower pressure space via the groove 15 of the rotation seal ring 2 and the groove 16 of the fixed seal ring 1.

As described hereinabove, the mechanical seal unit mounted on a pump enables a momentary release of the high pressure fluid to the atmosphere by temporarily forming the fluid release passage. With this arrangement, the undesirable presence of abrasion particles which are inevitably produced from the seal faces during frictional slidable movement thereof are able to be discharged out of the pump due to a pressure head, thus preventing their inclusion into the fluid moving though the pump.

It is a general principle for a mechanical seal unit that it be constructed to provide a fluid tight arrangement for the mutually slidable sealing faces as leakage of fluid from the pump is undesirable in practice. In a sense, the present invention is proposed against this principle and therefore proposes a revolutionary concept that the seal unit allows a partial leakage or release of fluid. More specifically, however, the inlet groove and the outlet groove are located such that the fluid passage is formed only temporarily, thereby minimizing leakage of fluid when the pump is stopped.

Needless to say, the scope of the present invention should not be limited to the above-described embodiments and may be variously modified. There may be variations of the groove in number and allocation within the scope of the present invention. As long as the rotation seal ring and the fixed seal ring have corresponding grooves in number and orientation angle, it will be possible to minimize the probability of leakage of the fluid in an inactive mode of the pump. If the probability of leakage is ignored in an inactive mode, the number of grooves in the fixed seal ring and the rotation ring do not have to be the same. It also may be possible to reverse the direction of open ends of the grooves in the two rings.

What is claimed is:

1. A mechanical seal unit for pumps including a fixed seal ring and a rotatable seal ring each providing a seal contact face such that the two seal faces slidably engage with each other in a fluid tight fashion, wherein one of the fixed seal ring and the rotatable seal ring has on its contact face at least one inlet groove open exclusively to a higher pressure space;

the other of said two seal rings has on its contact seal face at least one outlet groove open exclusively to a lower pressure space or the exterior of the pump; and said inlet groove and said outlet groove partially communicate with each other and jointly form a fluid release passage only temporarily at a certain point of rotation of the seal contact face of the rotatable seal ring relative to the seal contact face of the fixed seal ring.

2. A mechanical seal unit according to claim 1, wherein said inlet groove is disposed on the rotatable seal ring while said outlet groove is disposed on the fixed seal ring, and said inlet and outlet groove have the same configuration.

3. A mechanical seal unit according to claim 2, wherein said inlet groove has a linear shape.

4. A mechanical seal unit according to claim 2, wherein said inlet groove has a U-shape.

* * * * *

UNITED STATES PATENT AND TRADEMARK OFFICE
CERTIFICATE OF CORRECTION

PATENT NO.    : 6,485,021 B1
DATED         : November 26, 2002
INVENTOR(S)   : Soichiro Osaki et al.

It is certified that error appears in the above-identified patent and that said Letters Patent is hereby corrected as shown below:

<u>Title page,</u>
Insert:
-- [73] Assignee: "Nikuni Machinery Industrial Co. Ltd., 843-5, Kuji Takatsu-ku, Kawasaki-shi, Kanagawa-ken, Japan --.

Signed and Sealed this

Third Day of May, 2003

JAMES E. ROGAN
*Director of the United States Patent and Trademark Office*